US010215172B2

(12) United States Patent
Wood et al.

(10) Patent No.: US 10,215,172 B2
(45) Date of Patent: Feb. 26, 2019

(54) AUTOFRETTAGE OF THERMALLY CLAD COMPONENTS

(71) Applicant: WEIR GROUP IP LIMITED, Glasgow (GB)

(72) Inventors: James Wood, Bridge of Weir (GB); Gladys Schnier, Glasgow (GB)

(73) Assignee: Weir Group IP Limited, Glasgow (GB)

( * ) Notice: Subject to any disclaimer, the term of this patent is extended or adjusted under 35 U.S.C. 154(b) by 0 days.

(21) Appl. No.: 15/547,340

(22) PCT Filed: Jan. 29, 2016

(86) PCT No.: PCT/GB2016/050205
§ 371 (c)(1),
(2) Date: Jul. 28, 2017

(87) PCT Pub. No.: WO2016/120636
PCT Pub. Date: Aug. 4, 2016

(65) Prior Publication Data
US 2018/0003172 A1 Jan. 4, 2018

(30) Foreign Application Priority Data
Jan. 30, 2015 (GB) .................................... 1501538.1

(51) Int. Cl.
*F04B 53/16* (2006.01)
*C21D 7/12* (2006.01)
(Continued)

(52) U.S. Cl.
CPC ................ *F04B 53/16* (2013.01); *B23P 9/00* (2013.01); *C21D 7/12* (2013.01); *C21D 9/08* (2013.01);
(Continued)

(58) Field of Classification Search
CPC .......... F04B 53/16; F04B 53/168; C21D 7/12; C21D 9/08; B23P 9/00; Y10T 29/49805; Y10T 29/49968; Y10T 29/49236
See application file for complete search history.

(56) References Cited

U.S. PATENT DOCUMENTS

2004/0052964 A1  3/2004 Kaufmann
2008/0000065 A1* 1/2008 Ganguly ............... F04B 53/162
                                                      29/421.1
(Continued)

FOREIGN PATENT DOCUMENTS

EP           1531260 A1    5/2005

OTHER PUBLICATIONS

International Search Report and Written Opinion of the ISA, ISA/EP, Rijswijk, NL, dated May 9, 2016.
(Continued)

*Primary Examiner* — Atif Chaudry
(74) *Attorney, Agent, or Firm* — Foley & Lardner LLP

(57) ABSTRACT

A method of generating compressive residual stresses through a thickness of a metal component comprising the steps: receiving a metal base component (10), which in use is subjected to applied pressure and applying by thermal deposition cladding (16) to one or more surfaces (14) of the base component. The cladding (16) comprises one or more layers of metal or metal alloy. The method also includes, subsequent to the cladding step, applying autofrettage to the clad component thereby generating compressive residual stresses through the one or more layers of metal or metal alloy (16) and at least part way through the base component.

13 Claims, 3 Drawing Sheets

(51) Int. Cl.
*B23P 9/00* (2006.01)
*C21D 9/08* (2006.01)
*F04B 47/02* (2006.01)
*E21B 43/26* (2006.01)

(52) U.S. Cl.
CPC .............. *E21B 43/26* (2013.01); *F04B 47/02* (2013.01); *F04B 53/168* (2013.01); *Y10T 29/49236* (2015.01); *Y10T 29/49805* (2015.01); *Y10T 29/49968* (2015.01)

(56) References Cited

U.S. PATENT DOCUMENTS

| | | | |
|---|---|---|---|
| 2009/0084255 A1 | 4/2009 | Carter et al. | |
| 2012/0213651 A1 | 8/2012 | Ochoa et al. | |
| 2013/0042752 A1 | 2/2013 | Marshall et al. | |
| 2013/0161013 A1* | 6/2013 | McCoy | F04B 47/00 166/308.1 |
| 2015/0219096 A1* | 8/2015 | Jain | F04B 15/02 417/443 |
| 2015/0274006 A1* | 10/2015 | Chung | B29D 22/003 220/586 |

OTHER PUBLICATIONS

Search Report dated Sep. 4, 2016 in Parent Application GB 1501538.1, 1 page.

* cited by examiner

AUTOFRETTAGE OF THERMALLY CLAD COMPONENTS

CROSS-REFERENCE TO RELATED APPLICATIONS

This application is a 371 U.S. National Stage of International Application No. PCT/GB2016/050205, filed Jan. 29, 2016, which claims the benefit of and priority to British Patent Application No. 1501538.1, filed Jan. 30, 2015. The entire disclosures of the above applications are incorporated herein by reference.

TECHNICAL FIELD

The present invention relates to a process of generating compressive residual stresses in a component that includes a thermally deposited layer. In particular, the present invention relates to applying an autofrettage process to a thermally clad component thereby generating compressive residual stresses through a clad surface and at least partway through the base surface to which the cladding is applied.

BACKGROUND

Hydraulic fracturing or fracking is a process that involves injecting fluid at high pressure into subterranean rocks thereby creating openings, in the form of cracks, to allow the extraction of oil or gas.

In operation, fluid ends of a fracking pump are subject to localised high pressures because the fluid ends deliver high pressurized fluid into the impermeable layers of the subterranean rock such that the tensile strength of the impermeable layers is overcome and cracks form. The cracks penetrate the impermeable layers and therefore facilitate recovery of oil or gas from a gas/oil bearing formation located beneath the impermeable layers. As such, gases, such as methane can be retrieved and utilised.

Due to the extreme environment in which the pumps and fluid ends are utilised various studies have identified premature failure of the fluid ends due to fatigue cracking. Cracking is also affected by erosion and corrosion of the internal surfaces of the fluid ends. This has been identified particularly in fluid ends manufactured from 4330 steel.

It is desirable to improve material properties of components used in an extreme environment, for example to improve the effects of fatigue and stress corrosion cracking.

It is desirable to reduce the effects of fatigue cracking in fluid ends.

SUMMARY

A first aspect of the present invention provides a method of generating compressive residual stresses through a thickness of a metal component, the method comprising the steps:
receiving a metal or metal alloy base component, which in use is subjected to cyclic applied pressure;
applying by thermal deposition cladding to one or more surfaces of the base component, wherein the cladding comprises one or more layers of metal or metal alloy; and
applying autofrettage to the clad component thereby generating compressive residual stresses through the one or more layers of metal or metal alloy and at least part way through the base component.

Thermal deposition of a metal or metal alloy layer on a metal or metal alloy substrate according to a step of the first aspect of the invention is generally associated with improving erosion and corrosion properties of the substrate material in an extreme environment. Typically, thermal deposition results in the generation of tensile residual stresses at the surface and through the clad layer. An example of a material that is often used as cladding material to improve corrosion and erosion properties is Inconel 625. The cladding process involving Inconel 625 typically results in the generation of tensile residual stresses at the surface and through the clad layer. Typically, large discontinuity stresses are also generated at the interface between the clad material and the base/substrate component.

Autofrettage, being a metal fabrication technique, involves subjecting a component, for example a pressure vessel, to pressures high enough to cause tensile yield. As such the residual stresses, in the area of yielding, are compressive when the pressure is removed.

According to the method of the present disclosure, by applying autofrettage after thermal deposition of metal or metal alloy cladding any tensile residual stresses can be changed to compressive residual stresses. As such the lifetime of a component subjected to high cyclic pressures and an extreme abrasive environment can be extended because the process facilitates protecting the component against the extreme conditions associated with fatigue, stress corrosion cracking, erosion and corrosion. Autofrettage may also reduce discontinuity stresses at the interface of the substrate material and the cladding layer. The resultant changes to the as-clad residual stress field will improve fatigue life.

The method of the present disclosure may be used to transform residual stresses as follows: tensile stresses present in the deposited layer can be changed from tensile to compressive, the magnitude of discontinuity stresses at the interface of the deposited layer and the substrate can be altered and compressive residual stresses can be generated through a thickness of the component, to include the deposited layer, the interface between the deposited layer and the surface to which it is applied and through at least part of the surface to which the cladding is applied. This improves sustainability of the component against fatigue effects and erosion/corrosion effects.

The method of the present disclosure will commonly include a pre-heating step, wherein the surface of the base component is heated to a predetermined temperature before applying the one or more layers of metal or metal alloy by thermal deposition. Pre-heating is generally applied to prepare the metal component to achieve predetermined metallurgical properties of the cladding and interfacial fusion at the interface of the cladding and the substrate. Pre heating may also influence post clad residual stresses.

Thermal deposition may be by weld cladding. Alternatively, thermal deposition may be by laser cladding. Further examples of cladding by thermal deposition are high velocity oxygen fuel spraying (HVOF), plasma transferred arc, physical/chemical vapour deposition, for example electrostatic spray assisted vapour deposition, infiltration brazing, electroplated chromium, roll cladding, explosion cladding, electroslag strip welding, high-density infrared cladding etc.

Weld cladding provides a method of depositing material whilst creating fusion between the substrate material and the weld material thereby producing a metallurgical alloy at the interface of the substrate material and the weld material. By providing fusion of the materials at the interface the effect of autofrettage is realised through the complete depth of the cladding and beyond the interface into the substrate material thereby improving operating conditions by decelerating the effects of fatigue cracking which is normally associated with components operating in high cyclic pressure applications.

By generating compressive residual stresses through a depth of the component the effects of stress corrosion cracking is also improved. It will be appreciated that stress corrosion cracking is non-mechanically assisted cracking, which occurs when a component is in a corrosive environment and subject to tensile stress.

The one or more cladding layers may include an austenitic, nickel-chromium-based, alloy. Such an alloy is erosion and corrosion resistant and as such is well suited to an environment where the material is subjected to extreme environments, which may include being exposed to high cyclic pressures, heat and/or fluids containing particulate elements.

The austenitic nickel-chromium-based, alloy may include Inconel-625. Inconel-625 exhibits positive features in respect of corrosion/erosion resistance and weldability.

Alternatively, or in addition, the one or more cladding layers may include stainless steel. Stainless steels are iron alloys that contain a minimum of 10.5% Chromium. Precipitation hardening stainless steels contain chromium and nickel and exhibit the properties of martensitic and austenitic grades in relation to strength and corrosion resistance respectively. Stainless steel exhibits positive features in respect of corrosion resistance and strength. The one or more layers may include precipitation-hardening (PH) martensitic stainless steels, for example 17-4 PH stainless steel, which displays corrosion-erosion resistance comparable to an austenitic alloy.

Alternatively, or in addition, the one or more cladding layers may include 15-5 PH stainless steel.

Applying one or more materials in a multi-pass deposition process may facilitate further tailoring of the cladding performance and material properties of the as-clad component when subject to cyclic pressure loading.

The present disclosure demonstrates how to create an erosion and corrosion resistant clad component, which also has the benefit of improved longevity of working life in a cyclic pressure environment due to the induced compressive residual stresses, created by the autofrettage step. Tailoring the material properties can affect the performance of the component under predetermined loading conditions.

A further aspect of the present invention provides a pressure vessel comprising a metal base component, which in use is subjected to applied cyclic pressure, wherein one or more surfaces of the base component include one or more layers of metal or metal alloy applied by thermal deposition thereby providing cladding of the surface and wherein the clad component is or has been subject to an autofrettage process such that compressive residual stresses are generated through the one or more layers of metal or metal alloy and at least part way through the base component including the interface between the one or more surfaces and the cladding.

The metal base component may include a fluid end of a well service pump, for example a pump used for hydraulic fracturing. The fluid ends, generally comprise a cross-bore construction. The method of the first aspect of the invention may include applying one or more layers of metal or metal alloy to the surface of at least the cross bores. One or more layers of metal or metal alloy may be applied to all bore surfaces in contact with the corrosive-corrosive fluid. Alternatively, graded boundaries may be applied to prevent preferential corrosion and improve fatigue life, for example in partially clad bores.

It will be appreciated that a hydraulic fracturing pump operates in a hostile environment and is used to inject fluid at high pressure to hydraulically fracture medium, for example subterranean rock, into which the fluid is injected. As such, the cladding process protects the fluid ends against the abrasive effect of, for example fracking fluid, which may contain particulate material and the autofrettage process generates compressive residual stresses to improve fatigue resistance and therefore prolong the expected operating life of the component compared with an as-clad component or a component without cladding, which is subject only to autofrettage.

DESCRIPTION

Figure 1A:
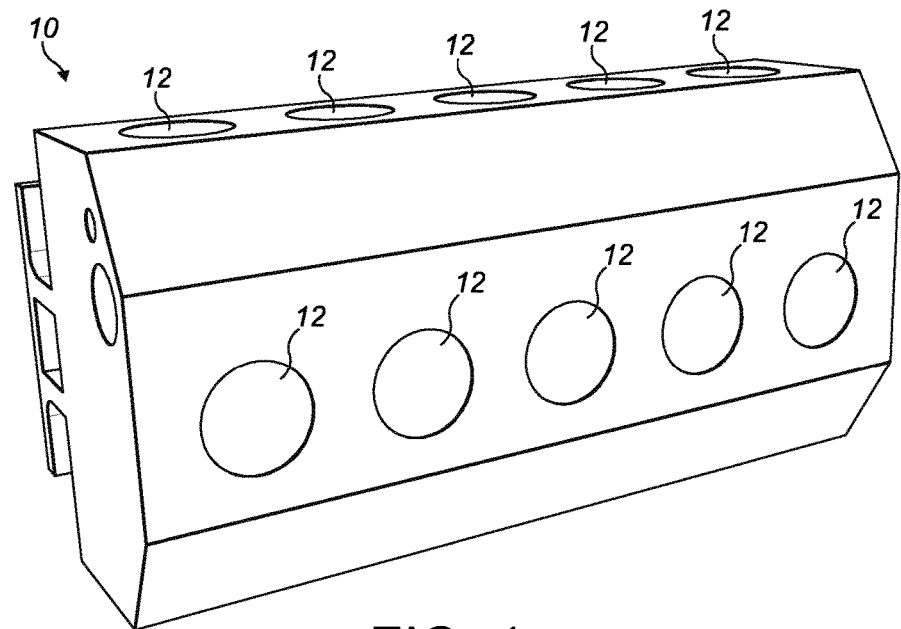
FIG. 1 illustrates a fluid end of a hydraulic fracturing pump as an example of an embodiment of this disclosure.
FIG. 1b illustrates a schematic representation of a cross-bore arrangement of a fluid end.
Figure 1B:
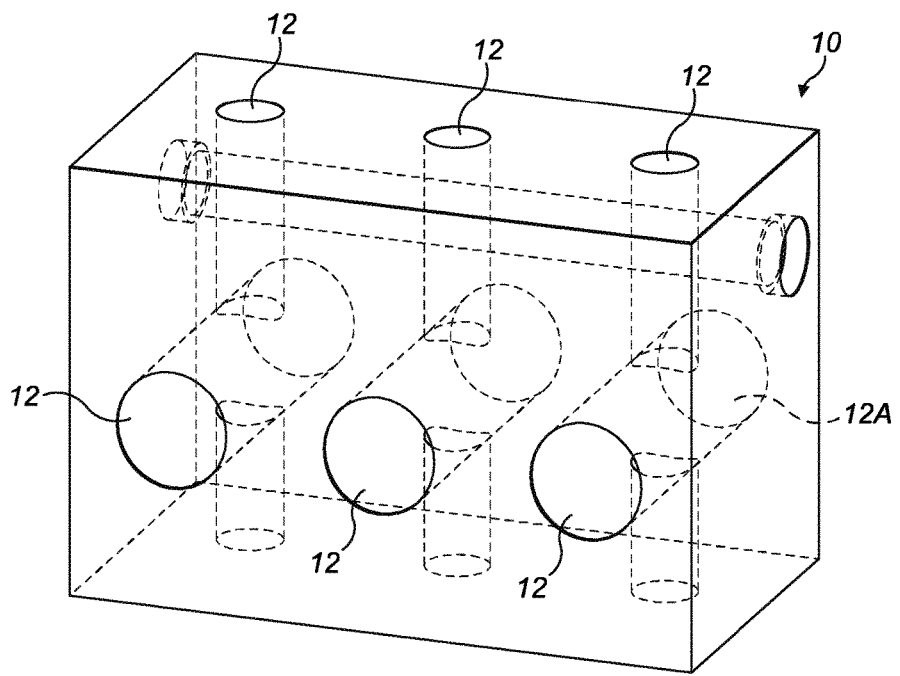

FIG. 1 illustrates an example of a fluid end 10 used in the application of hydraulic fracturing. The fluid end 10 is part of a high pressure hydraulic fracturing operation, where a fluid solution is pumped or injected into the ground. The illustrated example includes five vertical and five horizontal fluid passageways 12. The fluid end 10 represents the area of a pump which experiences the greatest wear over its working lifetime. Fluid ends can be worn out from intense or long term usage.

Generally, fluid ends that are worn are either repaired, refurbished or replaced. In fluid ends the intersections 12A (see FIG. 1a) exhibit very high stresses at the edges, defined by the intersection of two bores 12.

Figure 2:
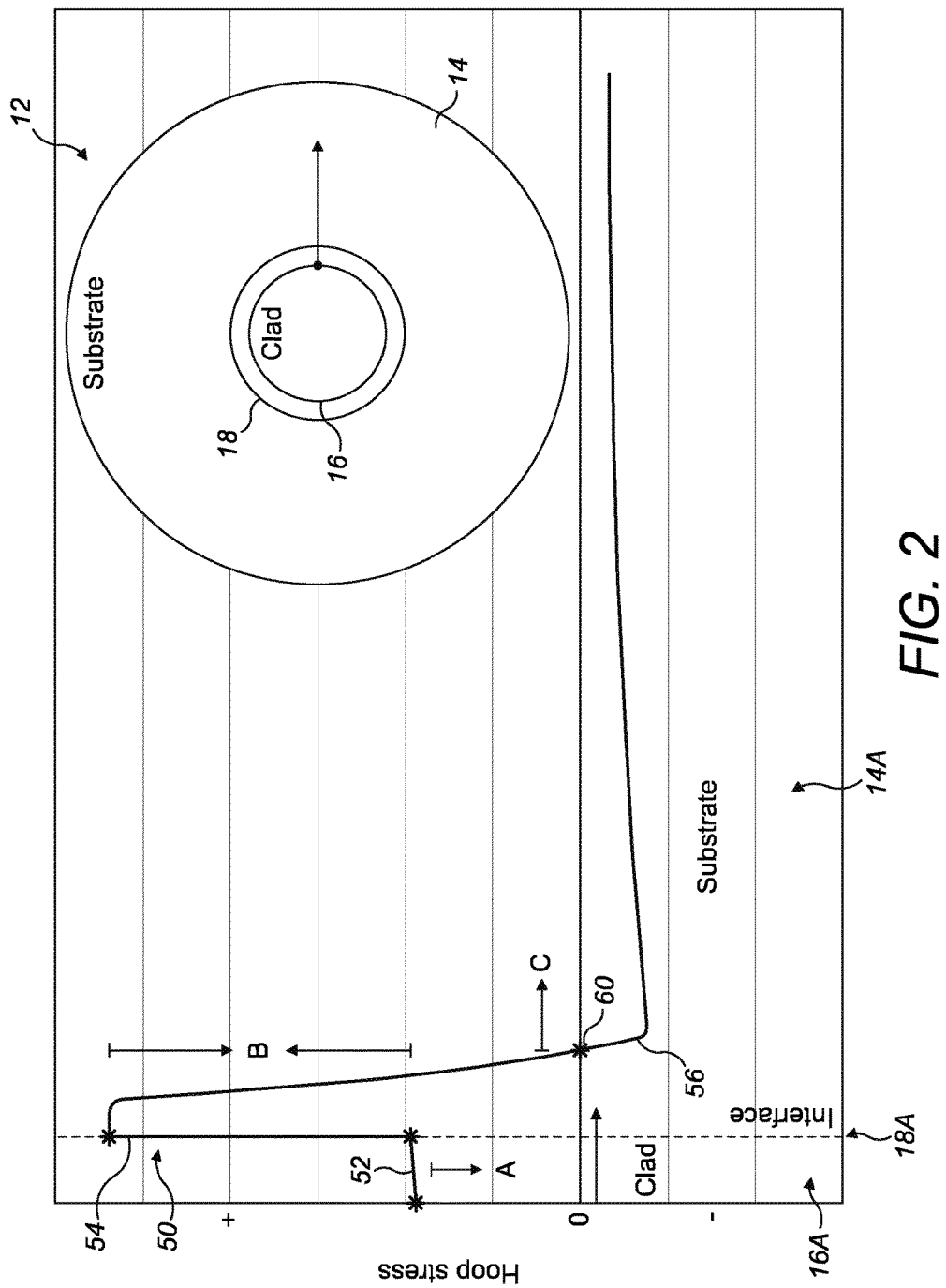
FIG. 2 illustrates a typical schematic representation of a substrate and cladding arrangement and a graphical representation of the residual stress distribution arising due to cladding.

FIG. 2 illustrates, schematically, a cylinder representative of a cross sectional view of a fluid passageway 12. The illustrated example is representative of a steel pipe 14, which provides a substrate material and includes internal cladding 16.

According to the present disclosure, the internal cladding 16 is applied by thermal deposition, for example weld cladding. Using thermal deposition ensures fusion of the cladding material 16 and the substrate material 14 at the interface 18 of the substrate material 14 and the cladding material 16. The thermal deposition of cladding material is responsible for generating a residual stress field, in many cases an undesirable tensile residual stress field, which according to the present disclosure can be subsequently modified to a desirable compressive residual stress field by applying autofrettage, as discussed further below.

FIG. 2 also includes a graphical representation of the distribution of hoop stresses through the thickness of the fluid passageway 12 and includes the distribution of hoop stress through the thickness of the cladding 16A, the interface 18A and a steel pipe 14 when subject to internal pressures.

In accordance with the present disclosure the cladding material 16 is applied to a steel substrate 14 by thermal deposition, specifically weld cladding. Weld cladding is an example of thermal deposition where a metal or metal alloy is applied to the surface of a metal or metal alloy substrate to provide a corrosion or oxidation resistant surface on a less corrosion-corrosion resistant material. Laser cladding is also an example of thermal deposition. In the illustrated examples the substrate material 14 is 4330 Steel™ with a cladding material 16 of a nickel chromium based superalloy, for example Inconel 625 ™. An alternative example, considered by the present disclosure, is the application of 17-4 PH stainless steel as the cladding material 16.

The application of a coating or cladding 16 on a substrate 14 using thermal deposition results in a self-equilibrating residual stress distribution primarily due to the thermal cycle and the associated metallurgical changes during melting, deposition, solidification and cooling of the material. Combining dissimilar materials means that different thermal expansion and varying constraint levels, rates of cooling and phase change effects come together at the interface, which can result in damaging tensile residual stresses through the thickness of the component. Generally, these tensile residual stresses cannot be fully stress relived. It will be appreciated that joining dissimilar materials and the manner in which the materials are joined can result in residual stresses.

Residual stresses can be detrimental or beneficial to the fatigue life of a component, for example fluid ends of a hydraulic fracturing pump (as represented in FIG. 1).

Residual stresses are elastic and arise from locked-in elastic distortion of the material's lattice structure. Residual stresses can affect crack initiation, crack propagation stages and interaction with the corrosion process.

The present disclosure has particular interest in the fatigue performance of a clad component, with a view to extending the life of such components.

Whilst it will be appreciated that cladding may have a beneficial effect in respect of erosion and corrosion, it is generally accepted that cladding is detrimental to fatigue life because tensile residual stresses are commonly induced through welding or machining processes. It will be appreciated that tensile residual stresses are undesirable in a component that is subject to cyclic pressure applications. Cladding and coating processes can also lead to discontinuity stresses at the interface transforming from tensile to compressive in nature or vice versa and therefore fatigue cracking at the interface is not uncommon.

In a cyclic pressure application it is desirable to induce compressive residual stresses at the surface of the component. It is also desirable to provide surface properties that are resistant to erosion and corrosion.

Cladding with a nickel chromium based material has been found to improve resistance to erosion and corrosion, but as indicated above the cladding process generally results in tensile residual stresses. In an embodiment of the present disclosure, applying hydraulic autofrettage, to the as-clad component changes the residual stresses at the surface and through a depth of the component from tensile to compressive. Compressive residual stresses are preferred to increase fatigue life in a cyclic pressure situation, which is normally associated with, for example fluid ends of a hydraulic fracturing pump, many oil and gas pipeline applications, high pressure and hydraulic lines, common rail injection, water jet cutting machines, gas cylinders, factory and power plant construction, chemical apparatus engineering etc.

Maximum operational stresses typically occur at the surface of a component. As such in a cyclic pressure operating environment it is desirable to induce compressive stresses. By applying autofrettage pressure a residual stress distribution is obtained where post clad tensile residual stresses are transformed to beneficial compressive residual stresses at the free surface of the cladding 16 and tensile discontinuity stresses at the interface 18 of the cladding 16 and the substrate 14 are reduced or eliminated.

By way of example, an analytical study of a system according to the present disclosure has identified that the desirable compressive residual stresses in a post-autofrettage system exists to a depth of around three times the depth of the cladding. For example referring to FIG. 3, the high autofrettage pressure of 800 MPa produced this effect.

Figure 3:
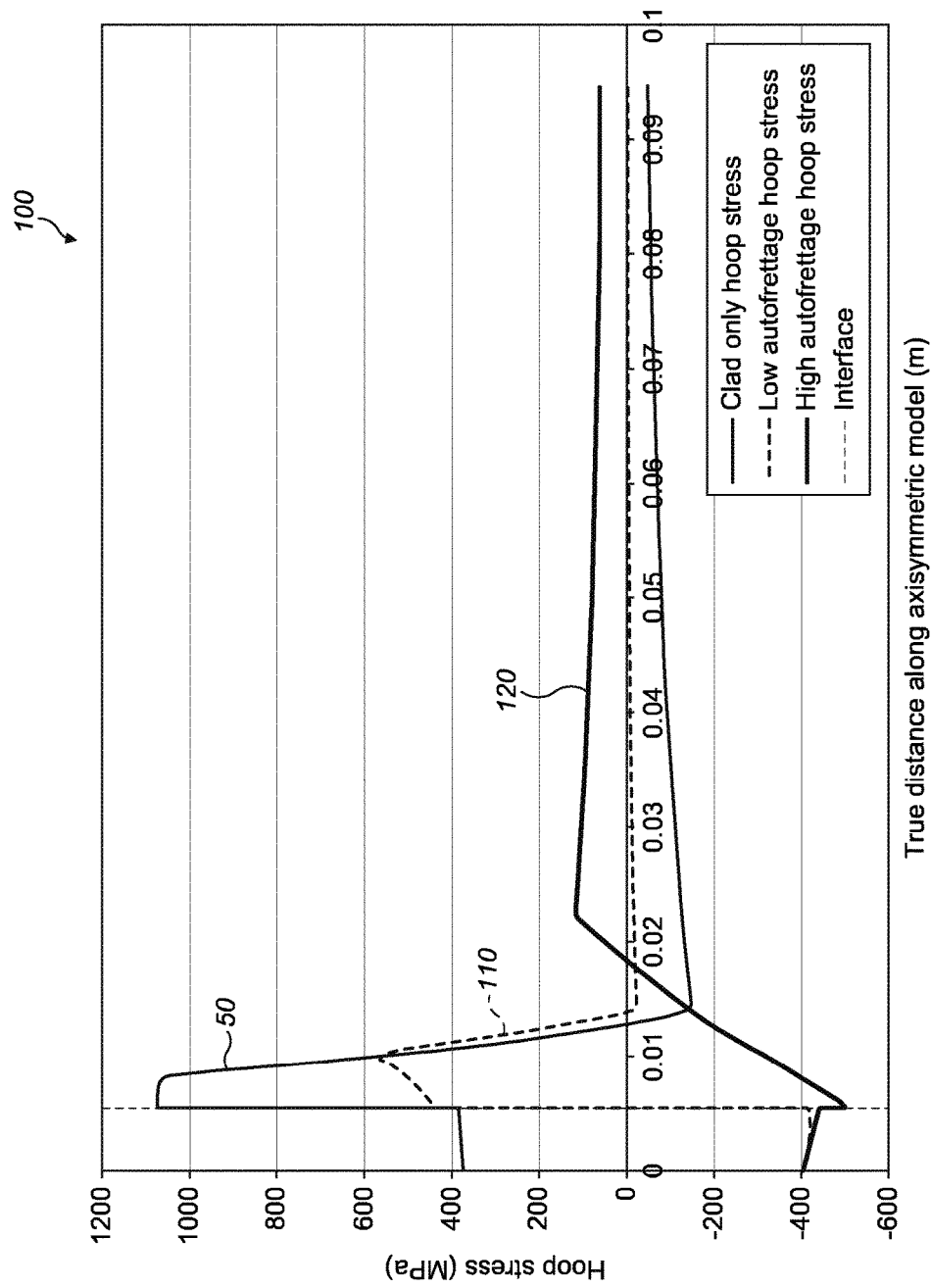
FIG. 3 illustrates a graphical representation of comparative hoop stresses in respect of clad only components and clad components subsequently subject to autofrettage according to this disclosure.

Referring to FIG. 2, the beneficial erosion and corrosion resistant properties of a nickel chromium based superalloy cladding are recognised. FIG. 2 illustrates a typical "as-clad" residual stress distribution 50. The as-clad stress distribution 50 is modified by the autofrettage process to provide a distribution as illustrated in FIG. 3.

In FIG. 2, the stresses in the "as-clad" component are shown to be tensile 52 in the region of the cladding, to have high (tensile) discontinuity stresses 54 in the region of the interface of the cladding and the substrate and low compressive stresses 56 in the substrate.

For effective autofrettage, the clad materials must have sufficient ductility for significant plasticity to occur.

By applying autofrettage, the tensile residual stresses in the cladding are transformed to compressive residual stresses. The autofrettage pressure can be selected to achieve the highest compressive residual stress possible at the surface of the cladding and through the thickness of the cladding. As such, the incidence of surface cracks initiating and propagating is also reduced. Two different autofrettage pressures, indicated as high and low, in FIG. 3, were applied to an as-clad component, each having the same properties to demonstrate the effect of different autofrettage pressures. The comparison is illustrated in FIG. 3.

The autofrettage process reduces or preferably eliminates tensile discontinuity stresses at the interface, again reducing the incidence of cracks initiating and propagating. By achieving the transformation of tensile residual stresses to compressive residual stresses in the cladding layer the crossover point 60 between compressive and tensile stresses can be shifted to within the substrate material (shifted right relative to the location on the graph as illustrated in FIG. 2).

Finite element simulations confirm that the transformation of tensile residual stresses to compressive residual stresses is achievable as indicated in FIG. 3, which is representative of a weld clad component that is subject to autofrettage. Finite element simulation and experimental measurements of an as-clad test piece confirm the nature of the residual stress distributions in the as-clad component.

By applying autofrettage to a clad cylinder, as illustrated in FIG. 2, the cylinder possesses an improved fatigue resistance compared with a homogeneous or as-clad cylinder.

Referring to FIG. 3, the graph illustrates simulation results for comparative stress distribution in a pipe comprising a substrate of 4330 steel and a 6 mm clad layer of Inconel 625™, which is a nickel chromium based superalloy.

The pipe 12 (see FIG. 2) has a cladding layer 16 applied by weld cladding where the cladding layer 16 is deposited in two passes at a melt temperature onto a pre-heated pipe 12, for example a fluid passageway. The pipe/substrate 12 is pre heated prior to the application of the cladding layer 16. It is common to pre-heat the substrate before applying cladding to allow for a slower cooling rate which encourages a more ductile material and therefore aids in avoiding cracking. For effective autofrettage, the clad materials must have sufficient ductility for significant plasticity to occur. The pre-heat temperature can either be dictated by welding codes or calculated according to the critical cooling rate with reference to the hardness of the material and using the carbon equivalent of the steel.

In FIG. 3, the graph 100 includes the stress distribution 50 of the as-clad model, which is not subject to the autofrettage process and the stress distribution 110, 120 associated with two different maximum autofrettage pressures, which are indicated as high and low autofrettage pressures on the graph. In the illustrated example the high pressure was higher than the low pressure by a factor of 2; namely, 800 Mpa and 400 MPa respectively.

As illustrated in FIG. 3 the stress distribution in the clad layer 110, 120 of the post-autofrettage component compared with the stress distribution 50 of the "as-clad" component is transformed from tensile residual stresses to beneficial compressive residual stresses. Therefore, the graph and independent experimental measurements confirm that applying autofrettage pressure does produce compressive residual stresses through the cladding layer 16. The curve 110 demonstrates that, by applying a relatively low autofrettage pressure, the tensile residual stresses in the substrate are transformed and the discontinuity stresses at the interface are reduced.

The curve 120 demonstrates that compressive residual stresses are present through the cladding 16, at the interface 18 of the cladding and the substrate 14 and through at least part of the substrate 14 when a relatively high autofrettage pressure is applied.

It will be appreciated that the metallurgy at the interface of two dissimilar materials may dictate the type of stress achievable at the surface, at the interface and through the substrate. As demonstrated by the graph presented in FIG. 3 the autofrettage pressure can be altered to manipulate the stress distribution from surface to substrate.

Whilst investigating the effects of different materials the inventors identified that compressive residual stresses can be generated when the substrate material 18 is clad with precipitation hardened martensitic materials, for example 17-4 PH stainless steel. The depth and distribution of the compressive stress may be modified and enhanced further using a post-cladding autofrettage process.

Autofrettage of weld-clad components has been demonstrated as an example of a post-cladding process that can significantly improve the fatigue performance of components which previously failed prematurely. The graphical results demonstrated in FIG. 3 show that the post-cladding autofrettage process of a steel cylinder including nickel chromium based superalloy cladding results in the transformation of tensile residual stresses to compressive residual stresses at the surface and into the substrate.

In addition to transforming tensile residual stresses at the surface of the cladding the present disclosure also demonstrates that tensile discontinuity stresses can be reduced or eliminated at the interface of the cladding and the substrate. Accordingly, the physical properties of a clad component can be tailored to meet the working environment in respect of fatigue and corrosion and erosion effects.

Autofrettage is a fabrication technique such that tensile yielding is effective throughout the cladding.

Whilst specific embodiments of the present invention have been described above, it will be appreciated that departures from the described embodiments may still fall within the scope of the present invention.

The invention claimed is:

1. A method of generating compressive residual stresses through a thickness of a metal component, the method comprising the steps:
receiving a metal base component, which in use is subjected to cyclic applied pressure;
applying by thermal deposition cladding to one or more surfaces of the base component, wherein the cladding comprises one or more layers of metal or metal alloy; and
applying autofrettage to the clad component thereby generating compressive residual stresses through the one or more layers of metal or metal alloy and at least part way through the base component.

2. The method as claimed in claim 1, wherein thermal deposition is by weld cladding/weld clad overlay.

3. The method as claimed in claim 1, wherein thermal deposition is by laser clad deposition.

4. The method as claimed in claim 1, wherein the autofrettage step comprises hydraulic autofrettage.

5. The method as claimed in claim 1, comprising applying by thermal deposition an austenitic, nickel chromium based, alloy.

6. The method as claimed in claim 1, comprising applying by thermal deposition an Inconel-625.

7. The method as claimed in claim 1, comprising applying by thermal deposition a stainless steel.

8. The method as claimed in claim 1, comprising applying by thermal deposition a precipitation-hardening (PH) martensitic stainless steel.

9. The method as claimed in claim 1, comprising applying by thermal deposition a 17-4 PH stainless steel.

10. The method as claimed in claim 1, comprising applying by thermal deposition a 15-5 PH stainless steel.

11. A pressure vessel comprising a metal base component, which in use is subjected to applied pressure, wherein one or more surfaces of the base component include one or more layers of metal or metal alloy applied by thermal deposition thereby providing cladding of the surface and wherein the clad component is or has been subject to an autofrettage process such that compressive residual stresses are generated through the one or more layers of metal or metal alloy and at least part way through the base component including the interface between the one or more surfaces and the cladding.

12. The pressure vessel as claimed in claim 11, wherein the metal base component comprises a fluid end of a well service pump.

13. The pressure vessel as claimed in claim 12, wherein the fluid end comprises a cross-bore configuration and wherein the cross bore configuration includes one or more layers of metal or metal alloy applied thereto by thermal deposition and being subject to autofrettage.

* * * * *